United States Patent [19]

Johnson

[11] 4,096,497

[45] Jun. 20, 1978

[54] MOUNTING APPARATUS HAVING SHOCK STABILIZING MEANS

[75] Inventor: Bruce K. Johnson, Andover, Mass.

[73] Assignee: Polaroid Corporation, Cambridge, Mass.

[21] Appl. No.: 748,118

[22] Filed: Dec. 6, 1976

[51] Int. Cl.² .............................................. G03B 17/50
[52] U.S. Cl. ........................................ 354/86; 354/304
[58] Field of Search ............................. 354/85, 86, 304

[56] References Cited

U.S. PATENT DOCUMENTS

3,974,510   8/1976   Ivester .................................... 354/86

Primary Examiner—John Gonzales
Attorney, Agent, or Firm—Kenneth W. Anderson

[57] ABSTRACT

A mounting apparatus for a pair of juxtaposed processing members included within a photographic camera at a critical predetermined location for optimizing the processing of an exposed self-developing type film unit by distributing a fluid processing composition between predetermined layers of the film unit to initiate a developing process therefor. The mounting apparatus comprises a bracket for rotatably mounting the processing members thereon which is adapted to be attached as an integral unit to internal structure within the camera on an entrance side of the processing members and a housing section having an integrally molded film exit slot adapted to be snap-fitted to the bracket with the film exit slot positioned at an exit side of the processing members. The processing members are releasably retained at the predetermined location and precluded from moving laterally, longitudinally and vertically out of the critical predetermined location. The mounting apparatus includes a shock stabilizing arrangement which provides a shock dampening effect which inhibits accidental damage or dislodgement of the processing members from the predetermined location occasioned through extraneous vibrations, sudden shock or jarring, or otherwise imparted thereto by accidental jarring or dropping of the photographic camera.

7 Claims, 5 Drawing Figures

MOUNTING APPARATUS HAVING SHOCK STABILIZING MEANS

BACKGROUND OF THE INVENTION

1. Field of the Invention

The present invention relates generally to a photographic camera with shock stabilizing means, and more particularly, to a pair of juxtaposed processing members positioned at a predetermined location in a shock stabilizing mounting within the camera for optimizing the processing of an exposed self-developing type film unit.

2. Description of the Prior Art

An important step in the processing of a self-developing type film unit having a photosensitive element is the distribution of a fluid processing composition between a predetermined pair of layers of the film unit, subsequent to exposure, to initiate a development and diffusion transfer process. In order to optimize the process, the processing composition must be uniformly distributed over an entire exposed area of the photosensitive element.

In a typical "peel apart" arrangement, a sheet of photosensitive material is first exposed to form a latent image therein and is subsequently progressively pressed against an image-receiving sheet with a predetermined quantity of processing fluid being disposed therebetween. The fluid may initially be releasably stored in a rupturable pod attached to a leading end of one of the sheets. As the film unit comprising the sheets and the pod is advanced leading end first between a pair of processing members, a compressive force is exerted upon the film unit which first ruptures the pod and subsequently spreads the processing fluid in a layer between the superposed sheets as is fully described in U.S. Pat. No. 3,080,805 entitled "Photographic Apparatus" issued on Mar. 12, 1963 to Joel A. Hamilton and assigned in common herewith. The processing members used therewith may typically comprise either a pair of juxtaposed pressure rollers, one roller and a stationary member, or a pair of rigid stationary members.

The photographic diffusion transfer process involved is an exceedingly delicate one, particularly when the process is one producing an image in full color. The mounting of the processing apparatus within the camera may well provide the difference between an image which is defective as, for example in its color properties, and one which is entirely satisfactory. Therefore, it is to be emphasized that the processing apparatus and a mounting arrangement therefor is critical to the photographic development of a satisfactory photographic print produced by a self-developing photographic camera.

Traditionally, in commercially available systems, the processing apparatus are manually operated. A leader attached to the film unit is pulled from within the camera to one side of the pressure-applying members thereby drawing a leading end of the film unit between the pressure-applying members whereby the leading end of the film unit may be grasped and the film unit withdrawn from within the camera between the pressure-applying members through a film exit slot included in a door pivotally attached to the body of the camera. A typical processing apparatus developed for use with a self-developing film of this type is fully described in U.S. Pat. No. 3,165,039 entitled "Photographic Apparatus" issued on Jan. 12, 1965 to Roger B. Downey and assigned in common herewith. The processing apparatus disclosed therein is principally mounted and fixedly secured to the pivotally mounted door attached to the body of the camera. The processing apparatus through the instrumentality of an intermediate mounting plate is secured to the pivotally mounted door. A support frame formed from a rigid metal serves as a basic support for a pair of juxtaposed pressure rollers. The support frame is permanently attached to the mounting plate by a pair of rivets whereby the entire support frame including the pressure rollers may be pivotally moved or raised to a non-operative position and lowered into an operative position as a unit with respect to the mounting plate for cleaning. The support frame is generally retained in the operative position against the mounting plate with the pressure rollers held in the operative position by a spring clip. Furthermore, the side walls of the support frame are secured to the mounting plate when the photographic camera is assembled at the factory whereby the relative position of the pressure members in the operative position is permanently established.

An improved processing apparatus is fully described in U.S. Pat. No. 3,745,904 entitled "Low-Cost Roller Type Photographic Fluid Spreading Apparatus" issued on July 17, 1973 to Herbert A. Bing et al. The processing apparatus disclosed therein is adapted to be inserted into and removed from the camera as an integral assembly. The processing apparatus comprises a pair of juxtaposed pressure rollers, bearing blocks and spring elements mounted upon a platform including a spring latch for releasably retaining the processing apparatus in the camera. The spring latch cooperates with a brace provided therefor upon an inner surface of a rear body member of the camera whereby the latch and brace cooperate to snap-fit and retain the processing apparatus in position upon the inner surface of the rear body member. The rear body member includes a film exit slot disposed transversely in a forward wall thereof for manually withdrawing the film units therethrough subsequent to its passage between the pair of juxtaposed pressure rollers or the processing members. The processing apparatus is positioned upon the rear body member such that the pressure rollers are adjacent to the film exit slot and the bite line between the pressure rollers is in alignment with the film exit slot whereby the film unit emerges from between the rollers in a natural or normal emerging path of travel through the film exit to the exterior of the photographic camera.

The mounting apparatus for the processing members including the latch and brace are specifically developed to provide a processing apparatus which may be rapidly and easily attached and removed from its mounted position upon the rear body member to facilitate the cleaning, repair or replacement of parts thereof. While improving the prior art through the ease in which the processing apparatus may be attached and detached from the camera and further lending itself to high volume fabrication and assembly, the processing apparatus relies upon the brace to urge a leading upright edge of the platform firmly against the forward wall of the rear body member and thereby maintain its position upon the rear body member in alignment with and adjacent to the film exit slot in the forward wall.

In the aforementioned processing apparatus, the ultimate goal was to provide an effective distribution of the processing composition contained in the pod without requiring a substantially high pull force to advance the film unit subsequent to exposure between the processing members. The processing apparatus were generally developed along the lines of augmenting the ability of a user to manually withdraw the film unit between the pressure rollers to the exterior of the camera. The mounting arrangements provided therefor positioned the processing members adjacent and in alignment with the film exit slot to substantially prevent the user from mistracking during the withdrawal of the film unit between the pressure members which may lead to insufficient coverage or light spreading of the processing composition across the image area of the photosensitive sheet of the film unit and thereby an unsatisfactory processing and development of the film unit.

Each "peel apart" film unit is provided with a photosensitive sheet which is exposed and a second or print-receiving sheet which remains superposed to the exposed photosensitive sheet during processing. Both of these sheets comprise a support which is opaque to light actinic to the photosensitive material of the photosensitive sheet thereby providing a dark chamber outside of the camera for developing the image. When the film unit is withdrawn from the camera and the processing members have distributed the released processing fluid contained in the pod in a layer between the photosensitive and print-receiving sheets, the photosensitive surface of the photosensitive sheet is protected from surrounding ambient light for a predetermined development period under the control of the user and the photosensitive and the print receiving sheets may be "peeled apart" manually by the user to present a fully developed photographic print.

Recently disclosed highly automatic self-developing cameras include processing members coupled by a gear train to a motor for processing and automatically advancing the film unit to the exterior of the photographic camera. Representative examples of the highly automated self-developing cameras are fully described in U.S. Pat. No. 3,714,879 entitled "Reflex Camera" issued on Feb. 6, 1973 to Edwin H. Land et al. and copending application Ser. No. 554,777 entitled "Photographic Apparatus With Sequencing System" filed Mar. 3, 1975 by Bruce K. Johnson et al. and assigned in common herewith. The photographic cameras are designed for use with a film pack comprising an exclosure or cassette containing "non-peel apart" self-developing type film units which may be integrated with a power supply system for operating electrically controlled mechanism included within the photographic camera. Representative examples of the integral "non-peel apart" self-developing film units are fully described in U.S. Pat. Nos. 3,415,644 entitled "Novel Photographic Products and Processes" issued on Mar. 10, 1967 to Edwin H. Land; and 3,594,165 entitled "Novel Photographic Products and Processes" issued on July 20, 1971 to Howard G. Rogers and assigned in common herewith. Basically, these integral film units are multilayer structures having a fluid processing composition including an opacifying constituent releasably stored in a rupturable pod or container at a leading end and a trap for collecting any excess fluid at a trailing end thereof. The multilayer structure of the film unit includes a pair of outer sheets which are bound together along lateral edges to cooperate with the trap to prevent the fluid processing composition from escaping from between a predetermined pair of layers during the processing operation.

The processing apparatus includes a pair of juxtaposed processing members or pressure rollers. During exposure operations image carrying light rays passing through a lens of the camera are directed onto a transparent surface layer of the film unit before impinging upon a photosensitive system of the film unit. A film advancing mechanism driven by a battery-operated motor which also drives at least one of the processing members serves to advance the film unit to the exterior of the camera subsequent to exposure. The film advancing mechanism removes the exposed film unit from within the cassette and advances the leading edge of the film unit in the direction of the entrance side of the processing members whereby the film unit passes between the pressure members which apply pressure thereto to rupture the pod and progressively distribute a mass of the processing composition intermediate the transparent element and the photosensitive system of the film unit. After passing therebetween, the film unit is released on the exit side of the processing members. Those portions of the film unit progressively exposed to ambient light beyond the exit side of the processing members have already been treated by the processing composition and the opacifying constituent which substantially precludes any ambient light incident upon the transparent layer from reaching adjacent sections of the photosensitive system.

One of the major considerations in developing camera systems for use with film units of this type is to protect non-processed portions of the photosensitive system of the film unit from ambient light. Such light rays can cause undesirable "fogging" or those yet untreated sections of the film unit's photosensitive system. While ambient light incident upon the transparent element of the treated section of the exit side of the processing apparatus cannot pass through the layer of processing composition to adjacent portions of the exposed photosensitive system, a portion of the light rays may be reflected internally of the light transparent element and scatter or diffuse lengthwise therealong until it reaches a position within the light transparent element in advance of the processing composition being spread intermediate the film unit's transparent element and the photosenstive system.

Therefore, in photographic cameras designed for use with film units of the type disclosed in the aforementioned U.S. Pat. Nos. 3,415,644 and 3,594,165, the mounting arrangement for the processing apparatus positions the processing members substantially within the housing of the camera and in direct contrast with the previously described mounting arrangements a predetermined distance away from the forward wall having the film exit slot transversely disposed therein to provide a dark chamber intermediate the exit side of the processing members and the film exit slot in the housing to prevent the film unit from emerging from between the processing members directly into the ambient light. As the film unit emerges from between the processing members on the exit side thereof and prior to its exit from the camera structure through the film exit slot, the portion of the processed film unit treated with the processing composition having the opacifying constituent included therein is shielded from ambient light by the dark chamber.

In direct contrast with the aforementioned manually operated processing apparatus, the film exit slot is displaced substantially below and out of alignment with the bite line between the processing members and thereby out of a natural planar path of travel of the film unit as it emerges from the exit side of the processing members. The length of travel of the film unit within the dark chamber as it emerges from the exit side of the processing member is substantially increased thereby substantially eliminating any adverse effect upon the film unit by ambient light which may penetrate through the film exit slot.

Because the lateral edges of the film unit are bound together, there is more resistance to the flow of the fluid processing composition adjacent to these edges than in a center portion of the film unit as the film unit passes between the rollers. The mass of fluid processing composition discharged by the pod tends to advance rearwardly between the layers of the film unit in a wave front having a greater concentration of fluid in the center than out at the lateral edges of the film unit. Also, the film unit has an inherent stiffness and as the film unit progressively emerges from the processing members into the dark chamber in a cantilever fashion it tends to follow the natural and substantially planar path of travel. A specially configured member extending from the forward wall of the camera's housing rearwardly in the direction of the processing member serves to engage the film unit as it emerges from between the rollers and to deflect it towards the film exit slot. In doing so, the specially configured member urges portions of the film unit still disposed on the entrance side of the processing members against the wave of fluid processing composition advancing rearwardly in the direction of the trailing end of the film unit between adjacent layers or elements thereof. As a result, the movement of the mass of processing composition is substantially controlled by decreasing the amount of processing composition in the center and providing uniformity in the amount of processing composition spread between the layers or elements of the film unit which would not be the case if the natural path of the film unit was left undisturbed as it emerged from the exit side of the processing members.

A self-developing camera having a motor driven spread system structure for inducing a bend in the film unit as it emerges from between the pressure-applying members is fully described in U.S. Pat. No. 3,810,211 issued on May 7, 1974 to R. Paglia et al., and assigned in common herewith. The camera is a compact, folding, single lens reflex type and includes a housing section which extends forwardly of a pair of juxtaposed pressure-applying members. The housing section includes a film exit slot therein which is substantially out of alignment with the natural or normal emerging path of travel of the film unit. A deflecting plate is dispersed in the emerging path of travel of the film unit for deflecting the emerging film unit inducing a beneficial bend or curvature thereto whereby the movement of the mass of processing composition is controlled and the film unit is guided into the film exit slot. The pressure-applying members are separated from the exit slot and the mounting apparatus therefor secures the pressure-applying members in a precise predetermined location within the housing in a fixed operative relationship with the deflecting plate and exit slot which is critical to the distribution of the fluid processing composition within the element.

In the camera described in U.S. Pat. No. 3,810,211, the bite line of the pressure-applying members is critical in determining the distribution of the processing composition and is a major concern in precisely positioning and securing the processing members in operative relationship with the deflecting plate and the film exit slot. A slight misalignment of the processing members which can develop from an extraneous vibration, sudden shock or jarring thereto can lead to incomplete spreading of the processing composition due to heavy concentrations of the processing composition early in the process and may lead to lean spreads resulting in leakage of the processing composition from the trap if the trap fails to contain sufficient volume for receiving the excess processing composition and may result in undesirable low quality photographic prints. For example, the processing apparatus designed for use in such cameras is engineered to provide a coating between the layers of the film unit having a tolerance of ±0.0002 inch of the nominal coating thickness. A coating exceeding the upper limit contributes to an incomplete spreading and any value below the lower limit leans towards leakage of the processing composition and photographic prints having a red tint.

The mounting apparatus used to secure the processing members in such cameras within the housing includes metal fasteners for fixedly securing the processing apparatus upon the inner base surface of the housing. A torsion spring is coupled to each end of a bottom pressure roller to bias it in the direction of an upper pressure roller of the processing apparatus. Precision piece parts requiring multiple adjustments are characteristics for the mounting of the processing members at their predetermined location in operative relationship with the deflecting plate and the film exit slot which greatly increases the cost of each piece part and additionally requires special fixing tools and costly man hours to assemble and repair the processing apparatus which is not conducive to providing a low cost camera for the mass amateur market. Furthermore, should the photographic camera be subjected to a sudden severe shock or jarring, the processing members may be dislodged from their previously established critical predetermined location enough to hinder their cricical operative relationship with the deflecting plate and the film exit slot.

Copending application Ser. No. 554,780 entitled "Self-Developing Camera with Film Unit Deflecting Structure", now U.S. Pat. No. 3,994,002, filed on Mar. 3, 1975 by Andrew S. Ivester and assigned in common herewith fully describes a new type of self-developing camera having a housing including a film exit slot and an integrally molded camming member for deflecting the film unit towards the exit slot as it emerges from between the processing members for influencing the distribution of the fluid processing composition being spread between the layers of the film unit. A mounting apparatus for the processing apparatus is fully described in a U.S. Pat. No. 3,974,510 entitled "A Mounting Apparatus For A Spread Roller Assembly" issued to Andrew S. Ivester on Aug. 10, 1976 and assigned in common herewith. The mounting apparatus comprises a bracket for rotatably mounting a pair of juxtaposed pressure-applying members thereon and structure which cooperates with integrally molded structure formed upon an inner surface of a housing section to releasably couple the bracket thereto at a predetermined location therein. The housing section integrally includes a film exit slot transversely disposed therein and a camming member extending rearwardly from a forward wall of the housing section in the direction of the exit side of the processing members for deflecting the film unit as it emerges from between the processing members which serves to influence the distribution of the processing cooperation and to guide the film unit through the film exit slot to the exterior of the camera.

The photographic camera includes a film cassette receiving chamber for slidably receiving a film cassette having a plurality of unexposed film units therein. The bracket is pivotally coupled to a frame located near the entrance to the receiving chamber so that the processing apparatus including the processing members is aligned in operative relationship with an inserted film cassette. The integrally molded structure of the housing section provides a snap fit mounting for the bracket whereby the pressure rollers are releasably retained at the predetermined location therein with the processing members located substantially above the film exit slot and the camming member disposed in the emerging path of travel of the film unit as it is released from between the processing members on the exit side thereof. The snap fit mounting arrangement provides a snug fit between the processing apparatus and the housing section which substantially prevents lateral, rotational and longitudinal movement therein. The processing apparatus is rigidly held to maintain its predetermined location therein whereby the processing members are retained in operative relationship with the film cassette supported in the receiving chamber of the receiving side and with the camming member and thereby the film exit slot on the exit side of the processing members. Furthermore, the housing section forms the forwardmost section of the camera's housing, that is to say, the remainder of the camera, the lens, film receiving chamber, electrical system etc. are positioned within a main housing of the camera rearwardly thereof which is connected to the housing section by the processing apparatus. In an assembled relatively light weight camera having a total weight of approximately one pound, the processing apparatus contributes substantially to the mass of the camera. The processing apparatus being positioned substantially forward and below the center of gravity of the camera tends to throw the camera out of balance and to make the camera "nose heavy". A carrying strap designed for use in transporting the camera is attached to a rear wall of the main housing of the camera whereby the camera is carried about with the forward wall of the housing section pointed towards the ground. Therefore the camera is generally carried in a normal swinging motion and should the camera be accidentally jarred or inadvertently dropped, the housing section having the processing apparatus rigidly supported therein generally strikes the ground first subjecting the camera to sudden and severe shock which is transmitted directly to the mounting bracket and the critically located processing members. It has been discovered that the kinetic energy received thereby from the impact is imparted through the housing section to the processing apparatus and can lead to substantial damage and severely disrupt the critical relationship between the processing members and the film cassette on the entrance side thereof and the processing members, the camming member and film exit slot on the exit side thereof. In addition thereto, the rigid, snap fit mounting of the mounting bracket within the integrally molded structure of the housing section may, due to conflicting manufacturing tolerances between the mating parts, set up stresses in the mounting bracket whereby the mounting bracket is provided with a backlash reaction to location of the bracket within the housing section thereby initially effecting the critical location of the processing members therein.

From the foregoing, it can be seen that there is a need for a shock stabilizing mounting arrangement for a processing apparatus which includes a shock damping effect to deter accidental damage and dislodgment of the processing apparatus releasably mounted and retained as an integral assembly at a predetermined, critical location upon an inner surface of a housing section and which substantially eliminates backlash reaction to location during the attachment of the processing apparatus to the housing.

SUMMARY OF THE INVENTION

The present invention relates to a processing apparatus and a mounting apparatus therefor having improved structure for providing a shock stabilizing mounting for a pair of juxtaposed processing members releasably retained at a predetermined location within a housing section of a photographic camera. The processing apparatus cooperates with the housing section to play an active and important part in a distribution of a fluid processing composition contained within a self-developing type film unit.

The mounting apparatus comprises a bracket, preferably formed from a unitary piece of sheet metal, a pair of juxtaposed processing members or pressure-applying members, a housing section having an integrally molded film exit slot transversely disposed therein, a camming member for deflecting the film unit to induce a bend therein for influencing the distribution of the fluid processing composition and a shock stabilizing means. The housing section and the bracket preferably include complementary snap fit coupling means for automatically releasably coupling the bracket at a predetermined location within the housing section in operative relationship with the camming member and the film exit slot disposed within the forward wall of the housing section. The film exit slot is substantially displaced out of alignment with a natural or normal emerging path of travel of the film unit as it emerges from between the processing members at a film exit side thereof.

The processing members are mounted in juxtaposition for rotation upon the bracket which in turn is pivotally attached to inner structure of the photographic camera, adjacent to and in alignment with an entrance to a film cassette receiving chamber of the photographic camera. Subsequent to exposure, the exposed film unit is automatically removed from within the cassette by a film advancing mechanism and advanced towards an entrance side of the processing member to initiate the processing thereof. As the film unit emerges from between the pressure rollers the camming member deflects the film unit to influence the distribution of the processing composition and to guide it through the film exit slot to the exterior of the camera.

The pressure rollers are predeterminedly located within the housing section to critically provide proper distribution of the fluid processing composition between a predetermined pair of adjacent layers of the exposed film unit to initiate a development and diffusion transfer process. The processing members must be located and retained in the predetermined location to optimize the processing of the film unit and to uniformly distribute the processing composition over the entire photoexposed area of the film unit. The operative relationship between the processing members and the integrally molded camming member must be sustainted so that the gentle bend induced by the camming member as the film unit emerges from between the processing members on the film exit side augments the distribution of the processing composition.

Therefore, the mounting apparatus for the processing apparatus of the present invention includes a shock stabilizing mounting for the processing members which releasably retains the processing members in the predetermined location in a snap fit arrangement within the housing section whereby the processing members are sustained in operating relationship with the film cassette receiving chamber, the integrally molded camming member, and the film exit slot and further serves to positively inhibit accidental damage and/or dislodgement of the processing members from the predetermined location despite an impact from extraneous vibrations, sudden shock or accidental jarring imparted to the photographic camera.

It is the primary object of the present invention to provide a mounting apparatus including a shock stabilizing means for positively inhibiting the movement of a pair of juxtaposed processing members mounted at a critical, predetermined location within a photographic camera out of the predetermined location upon receiving a severe shock resulting from extraneous vibrations, impact, jarring or otherwise.

Another object of the invention is to provide a mounting apparatus of the type indicated which releasably retains a pair of juxtaposed processing members predeterminedly located in a snap fit mounting within a housing section of a photographic camera in operative relationship with integrally molded structure formed upon inner surfaces of the housing section for optimizing a processing of an exposed self-developing type film unit.

Other objects of the invention will in part be obvious and will in part appear hereinafter.

The invention accordingly comprises the apparatus possessing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in connection with the accompanying drawings wherein.

DETAILED DESCRIPTION OF THE INVENTION

Figure 1:
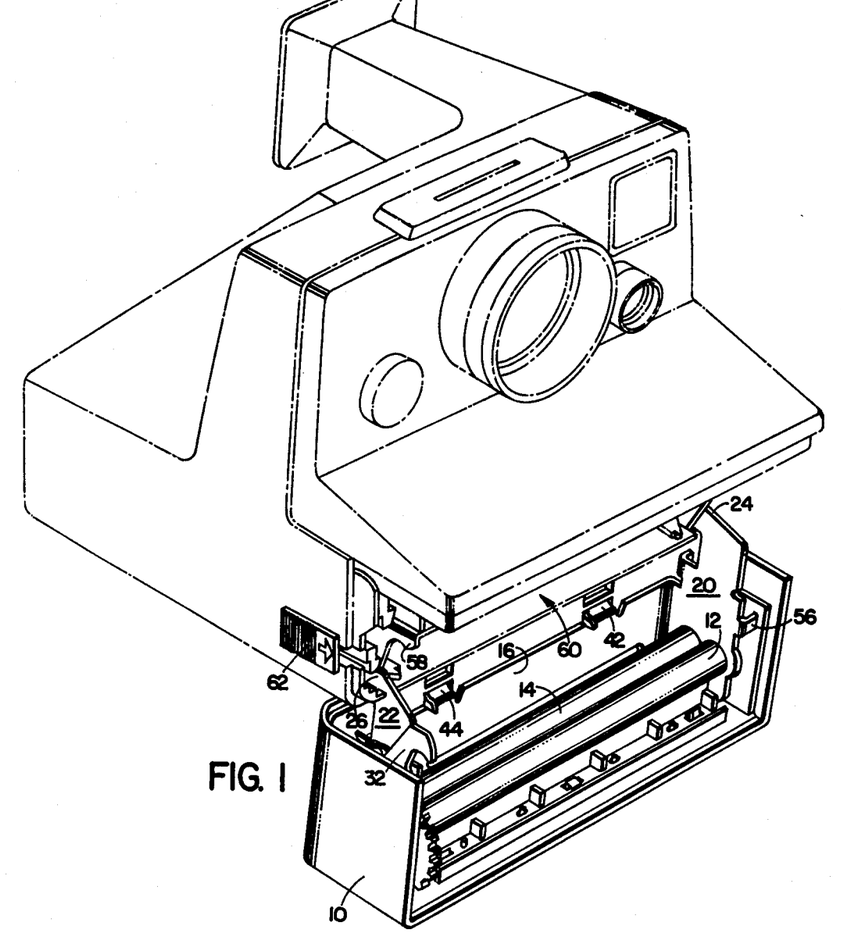
FIG. 1 is a perspective view of a compact, modular self-developing type photographic camera shown in phantom with a section of the housing embodying the present invention in solid lines and pivotally lowered into an unblocking position to provide access to a film receiving chamber for receiving and supporting a film cassette therein.

Referring in more detail by reference characters, FIG. 1 shows a fully automatic self-developing type photographic camera for receiving and supporting therein a film cassette including a plurality of self-developing type film units. The photographic camera includes a housing section 10 having a pair of juxtaposed processing or pressure-applying members 12 and 14 releasably retained at a predetermined location within the housing section 10 for applying compressive pressure to the film unit as it is advanced therebetween for distributing a fluid processing composition between predetermined layers of the film unit and thereby initiate a developing process within the film unit while simultaneously advancing it to the exterior of the photographic camera.

Figure 2:
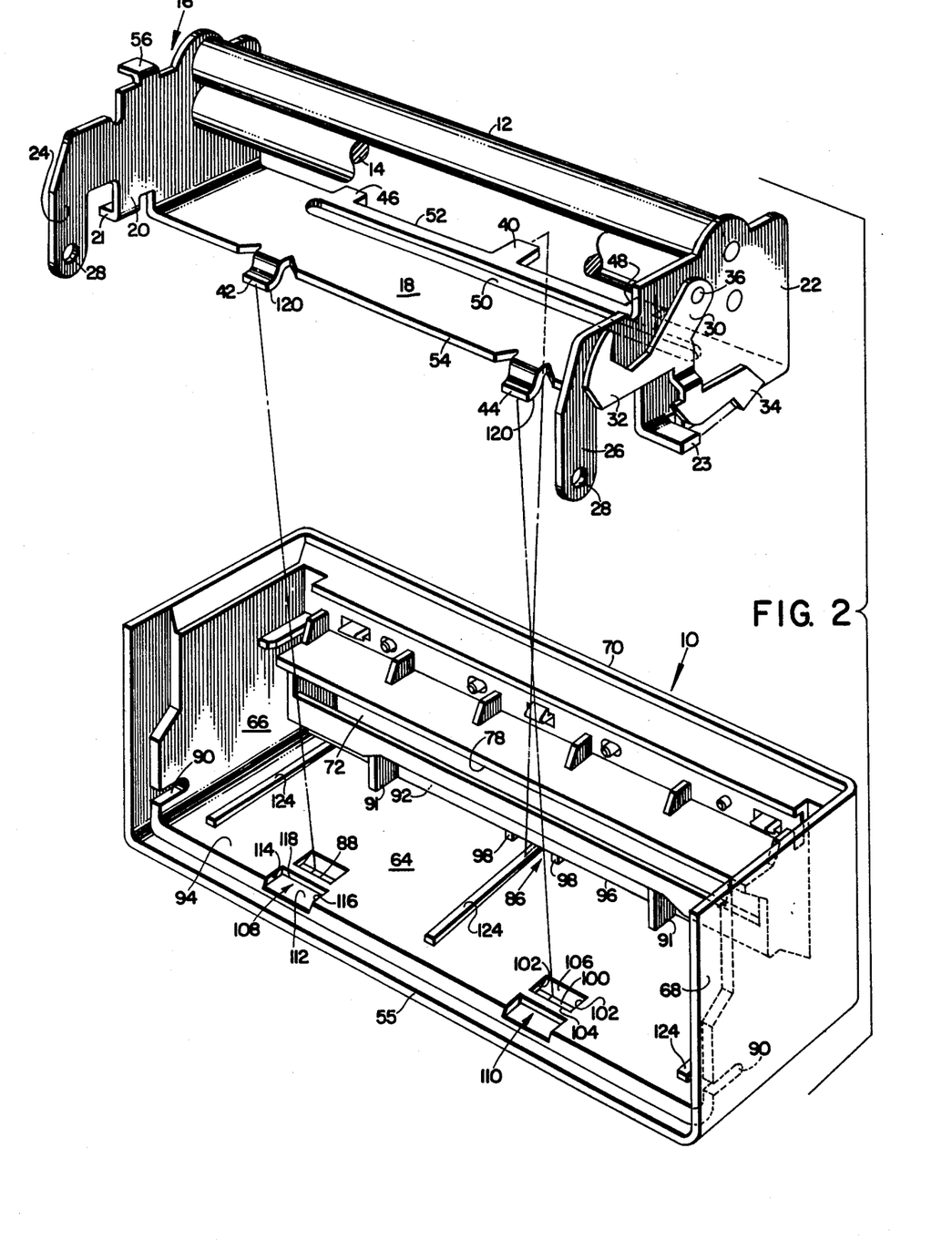
FIG. 2 is an enlarged, exploded, perspective view of the present invention including the processing apparatus and the housing section of the photographic camera shown in FIG. 1.
Figure 3:
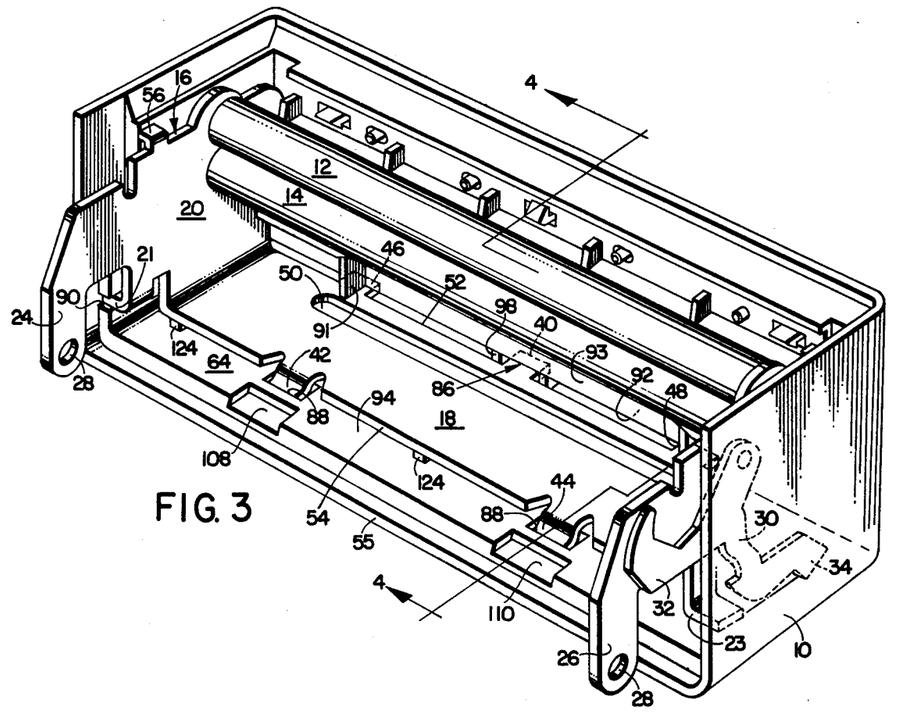
FIG. 3 is an assembled perspective view of the present invention shown with the housing section detached from the camera.
Figure 4:
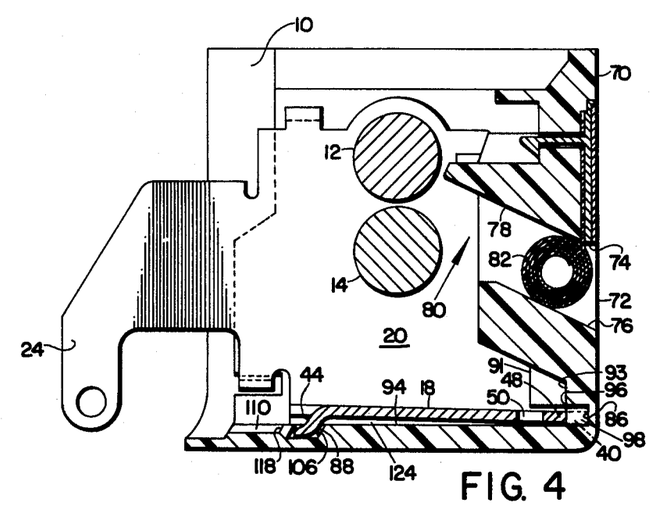
FIG. 4 is an enlarged, side elevational section view taken generally along the line 4—4 of FIG. 3.

As best shown in FIGS. 2, 3 and 4 a mounting apparatus for locating the processing members 12 and 14 accurately at a predetermined location within the housing section 10 and for positively inhibiting accidental movement of the processing members 12 and 14 out of the predetermined location should the photographic camera be shaken, dropped or otherwise subjected to sudden severe shocks or jarring, comprises a mounting bracket 16 and the housing section 10. The mounting bracket 16 is preferably stamped from a unitary piece of metal having a relatively high damping capacity, for example a high-carbon or alloy steel as opposed to a low-carbon steel. The structure and properties of the high-carbon material augment the rate of absorption of the kinetic energy imparted thereto by extraneous shock or impact forces introduced to the photographic camera.

The mounting bracket 16 includes a generally planar, horizontal bottom member 18 and a pair of integrally formed lateral upright members 20 and 22 extending substantially perpendicular to the bottom member 18 at opposing lateral ends thereof. The upright members 20 and 22 include a lower outwardly extending projection 21 and 23 respectively thereon. Integrally formed with the upright members 20 and 22 and extending rearwardly therefrom are a pair of arcuate mounting flanges 24 and 26, respectively, each including a hole 28 therein.

A latching member 30 including a rear leg 32 and a forward leg 34 is pivotally mounted upon an outer wall of the upright member 22. The latching member 30 is pivotally coupled to the mounting bracket 16 by a pin 36 for movement between latched and unlatched positions and is restricted to movement therebetween by the lower outwardly extending projection 23 acting as a rear leg stop which interrupts the pivotal movement of the latching member 30 at the latched and unlatched positions and prevents the latching member 30 from pivotal movement beyond these positions.

The bottom member 18 integrally includes a guiding and locating member 40, a plurality of semi-rigid clip members 42 and 44 and shock stabilizing means including a plurality of deflection limiting members 46 and 48, and shock dampening means 50. The deflection limiting members 46 and 48 are integrally formed rigid, forwardly extending projections spaced along a first or forwardly facing edge 52 of the bottom member 18 having the guiding and locating member 40 integrally disposed intermediate and parallel with deflection limiting members 46 and 48. The guiding and locating member 40 is substantially greater in length than the deflection limiting members 46 and 48 and thereby extends from the forwardly facing edge 52 substantially beyond the protruding unattached ends of the deflection limiting members 46 and 48. That is to say, the nominal length of the guiding and locating member 40 from the forwardly facing edge 52 is 58 percent greater than a relative length therefrom of the deflection limiting members 46 and 48.

The semi-rigid clip members 42 and 44 extend downwardly and rearwardly from a second or rearwardly facing edge 54 of the bottom member 18 and are provided with relieved areas for enabling the clip members 42 and 44 to be flexed for vertical movement when the housing section 10 is coupled to the mounting bracket 16 in a manner to be described in detail hereinafter.

Upright member 20 includes an upper outwardly extending projection 56 which cooperates with the lower outwardly extending projections 21 and 23 and integrally molded structure formed upon inner surfaces of the housing section 10 to preclude lateral movement of the mounting bracket 16 therein.

The processing members 12 and 14 are rotatably mounted in juxtaposition upon the mounting bracket 16 between inwardly facing sides of the spaced upright members 20 and 22 with their respective lateral ends mounted in suitable bearings (not shown) provided within the upright members 20 and 22.

The photographic camera includes internal structure described in detail in U.S. Pat. No. 3,967,304 entitled "Modular Constructed Sequencing System for Photographic Apparatus", issued on June 29, 1976 to Bruce K. Johnson et al. The internal structure includes a mounting frame 58 having suitable means adapted to cooperate with the holes 28 included on the arcuate mounting flanges 24 and 26, respectively whereby the mounting bracket 16 having the housing section 10 attached thereto may be pivotally mounted for movement between positions blocking and unblocking an open end of a film cassette receiving chamber 60. When the mounting bracket 16 is pivotally moved to the blocking position to secure a film cassette within the receiving chamber 60, the latching member 30 cooperates with a latch and slidable latch release 62 to maintain the mounting bracket 16 in the secured position in a manner substantially the same as described in U.S. Published Patent Application No. B502,161 entitled "Film Cassette Loading Door Latch and Interlock Switch for Photographic Apparatus" published on Mar. 2, 1976 by Andrew S. Ivester et al.

The mounting bracket 16 for rotatably supporting the processing members 12 and 14 thereon is readily attachable and detachable as an integral unit from the housing section 10 as described in the aforementioned U.S. Pat. No. 3,974,510. The processing members 12 and 14 are keyed to the film cassette receiving chamber 60 in a precise location established by the mounting frame 58 fixedly secured within the receiving chamber 60 to receive the film unit subsequent to exposure as it is advanced from within the film cassette to a film entrance side of the processing members 12 and 14.

The housing section 10 is of an integrally molded construction comprising a base wall 64, a pair of laterally spaced side walls 66 and 68 and a forward wall 70 forming mutual substantially perpendicular walls. The base wall 64 is adapted to underlie the bottom member 18 of the mounting bracket 16 and forms a horizontal extension of a bottom wall of the film cassette receiving chamber 60 when the mounting bracket 16 having the housing section 10 releasably attached thereto is latched in the secured, blocked position. The side walls 66 and 68 are spaced to receive the laterally spaced upright members 20 and 22 therebetween. The forward wall 70 includes an integrally molded film exit slot 72 transversely disposed therein. The film exit slot 72 is defined by upper and lower edges 74 and 76 respectively through which an exposed and subsequently processed film unit is advanced to the exterior of the photographic camera subsequent to its passage between the pair of juxtaposed processing members 12 and 14.

As was noted earlier, the film unit generally has an inherent stiffness and as it progressively advances in the direction of the forward wall 70 from the film exit side of the processing members 12 and 14 in cantilever fashion tends to follow a natural and substantially planar path of travel defined by the inherent stiffness thereof which is substantially parallel with the base wall 64 of the housing section 10.

In direct contrast to some of the previously described prior art processing apparatus for processing the "peel-apart" film units, the processing members 12 and 14 are not adjacently mounted in alignment with the film exit slot 72. Instead of the pressure-applying members 12 and 14 are adjacently mounted and in substantial alignment with the film cassette receiving chamber 60 whereby an advancing exposed film unit is substantially aligned with a bite line between the processing members 12 and 14 on the film entrance side thereof. In addition thereto, it is well known in the art that by deflecting the film unit from its natural or normal path of travel and by inducing a gentle and large radius bend in the film unit on the film exit side of the processing members 12 and 14 that the uniformity of distribution of the fluid processing composition within the film unit is significantly and beneficially influenced as disclosed in the aforementioned copending application Ser. No. 554,780.

The present housing section 10 includes an integrally molded camming member 78 for inducing a bend in the film unit as it emerges from between the processing members 12 and 14. The camming member 78 extends rearwardly from the upper edge 74 of the film exit slot 72 and defines a generally planar transverse inclined surface which is coextensive with the width of the film exit slot 72. The camming member 78 is disposed within the natural path of travel of the film unit as it emerges from between the processing members 12 and 14 for inducing a bend and guiding the film unit along an inclined surface of the camming member 78 through the film exit slot 72.

When the housing section 10 is attached to the mounting bracket 16, the processing members 12 and 14 are transversely disposed across the film cassette receiving chamber 60 a predetermined distance away from the forward wall 70 to provide a dark chamber 80 between the film exit side of the processing members 12 and 14 and an inner surface of the forward wall 70. The dark chamber 80 is formed to shield the light transparent elements of the film unit from light rays which may be reflected internally in advance of the spreading of the fluid processing composition between the layers of the film unit beyond the film entrance side of the processing or pressure-applying members 12 and 14.

In a preferred embodiment of the present invention, the photographic camera is provided with an extensible retractable light shield 82 of the type disclosed in U.S. Pat. No. 3,938,167 entitled "Film Catcher" issued on Feb. 19, 1976 to John N. Amey et al. and U.S. Pat. No. 3,940,774 entitled "Opaque Shade" issued on Feb. 24, 1976 to Andrew S. Ivester both of which are assigned in common herewith. The light shield 82 (best shown in FIG. 4) comprises a coil of opaque sheet material mounted within the housing section 10 adjacent the film exit slot 72 in position to be engaged by a leading edge of the exposed film unit as it is slidably advanced by the processing members 12 and 14 along the inclined surface of the camming member 78 within the dark chamber 80. The sheet of opaque material is uncoiled by the leading edge of the film unit so as to progressively cover, in lighttight relationship, portions of the film unit which have been treated with the processing composition and to prevent further exposure of untreated portions of the film unit to ambient light which may be transmitted lengthwise along the film unit. The light shield 82 is adapted to return to its coiled or retracted position after it has been completely uncoiled whereby the light shield 82 provides a protective cover for the film exit slot 72 when recoiled into the retracted position.

The operative relationship between processing members 12 and 14 and the film cassette receiving chamber 60, the film exit slot 72 and the camming member 78 is established by the proper mounting of the processing members 12 and 14 at the predetermined location within the housing section 10 and is critical in providing for the proper film unit distribution of the fluid processing composition between the layers of the exposed film unit. In addition thereto, the processing members 12 and 14, in order to remain in operative relationship therewith, must be mounted within the housing section 10 positively inhibited from being accidentally removed from the predetermined location in response to a severe shocking or sudden jarring of the photographic camera.

The photographic camera includes an adjustable carrying strap (not shown) which is fastened by suitable means within the photographic camera to a rear wall of the camera's housing, i.e., the wall opposite the forward wall 70. The photographic camera is carried by the user in a vertical plane at a substantial height about the ground with the forward wall 70 of the housing section 10 pointing downwardly at the earth's surface. The total weight of the photographic camera is approximately 16 ounces and the processing apparatus including the processing members 12 and 14 and the mounting apparatus therefor contribute substantially to the total weight thereof. Furthermore, the pressure-applying members 12 and 14 and the mounting apparatus therefor are positioned within the photographic camera substantially forward and below the photographic camera's center of gravity whereby the camera tends to be out of balance and "nose heavy". It has been discovered that due to the location of the carrying strap upon the camera, the manner in which the photographic camera is generally carried and the unbalanced nature thereof, the housing section 10 may be repeatedly subjected to substantially severe sudden shocks and accidental jarring through careless handling or dropping of the photographic camera.

It has been held necessary to provide a mounting apparatus for the pressure-applying members 12 and 14 capable of withstanding an extraneously applied impact or shock load of at least 4 foot-pounds of energy, that is to say to provide a mounting arrangement capable of inhibiting the movement of the processing members 12 and 14 out of the predetermined location when subjected to a drop test in which the 16 ounce photographic camera is released from a height of at least 4 feet.

Therefore, it is critical for the processing members 12 and 14 to be retained in the predetermined location within the housing section 10 wherein the bite therebetween is sustained in operative relationship with components on each side thereof, i.e. the film entrance side and the film exit side. The film cassette (not shown) for use with the photographic camera includes a film withdrawal opening in a leading end wall thereof through which each forwardmost film unit is advanced by the film advancing mechanism (not shown) subsequent to exposure in the direction of the entrance side of the processing members 12 and 14. The processing members 12 and 14 operate to apply a compressive pressure progressively along the length of the film unit while it is advanced therebetween towards the film exit side. The leading end of the film unit, upon emerging from the film exit side, must be released such that the film unit contacts the camming member 78 at a precise location and at a precise angle which acts to induce a gentle bend having a proper radius to prevent buckling or pinning the film unit against the camming member 78 as it acts to deflect and guide the film unit through the film exit slot 72.

The housing section includes integrally molded structure upon the inner surfaces thereof for cooperating with complementary structure upon the mounting bracket 16 for locating the housing section 10, particularly the film exit slot 72 and the camming member 78 with precision relative to the bite line, on the film exit side between the processing members 12 and 14. As best shown in FIGS. 2 and 3, the integrally molded structure comprises a means 86 for receiving the forwardly extending guiding and locating means 40 therein, means 88 for defining a recess or pocket means 90 for exerting a downward force upon the mounting bracket, and means 91 for restricting upward movement of the forward facing edge of the bottom member 18.

A blind elongated groove 92 is transversely disposed within an inner surface 93 of the forward wall 70 of the housing section 10 beneath the film exit slot 72. The groove 92 is partitioned off by a pair of ribs 98 extending vertically across the height of the groove 92 from an upper surface 94 of the base wall 64 and joins the inner surface 93 at the edge 96 to provide the receiving means 86 for slidably receiving and releasably retaining the forwardly extending guiding and locating means 40 configured to be snugly accommodated therein.

The means defining the recess 88 are adapted to receive and releasably retain the rearwardly and downwardly extending semi-rigid clip members 42 and 44 whereby the combination thereof comprises a complementary coupling means for snap fitting the mounting bracket 16 to the housing section 10 once the mounting bracket 16 is properly located at the predetermined position within the housing section 10. The recess means 88 are formed within the base wall 64 substantially beneath the upper surface 94 thereof and includes a base surface 100 extending substantially parallel with the upper surface 94, opposing lateral side walls 102 spaced apart a distance slightly greater than the width of the clip members 42 and 44 and extending vertically from the base surface 100 to join the upper surface 94 of the base wall 64 and a pair of opposing facing, substantially parallel inclined walls 104 and 106. The inclined walls 104 and 106 extend in a forwardly sloping direction vertically between the base surface 100 and the upper surface 94 of the base wall 64 to complete the recess means or pockets 88.

A pair of laterally disposed keyways 108 and 110 are disposed within the base wall 64 between a rearwardly facing edge 55 of the base wall and the recess means 88. The keyways 108 and 110 are longitudinally aligned with the recess means 88 and act to engage and subsequently guide the rearwardly and downwardly extending clip members 42 and 44 included upon the mounting bracket 16 into the recess means 88 as the mounting bracket 16 is slidably moved forward into the housing section 10 in the direction of the forward wall 70. The keyways 108 and 110 include a lead-in surface 112 formed substantially below and parallel with the upper surface 94 of the base wall 64 of the housing section 10. A pair of lateral sides 114 and 116, spaced apart to receive therebetween the lateral edges of the clip members 42 and 44, extend upwardly from the lead-in surface 112 to the upper surface 94 of the base wall 64. A ramp 118 including a forwardly and upwardly inclined surface extends from the lead-in surface 112 to join the upper surface 94 and is integrally joined to the lateral sides 114 and 116 of the keyways 108 and 110.

The mounting bracket 16 and housing section 10 may be coupled together by positioning the housing section 10 so that the upright members 20 and 22 of the mounting bracket 16 are positioned between the side walls of the housing section 10 whereby the mounting bracket 16 may be slidably advanced forwardly into the housing section 10 in the direction of the forward wall 70. The mounting bracket 16 is slidably guided and laterally positioned prior to being snap fittedly coupled to the housing section 10 by the engagement between the forwardly extending guiding and locating member 40 and the receiving means 86 provided therefor. As the mounting bracket 16 is slidably advanced, a bottom surface 120 of each clip member 42 and 44 is slidably moved across the lead-in surface 112 of the keyways 108 and 110 whereupon the ramp 118 is engaged and acts to forcibly elevate the clip members 42 and 44 from a downwardly extending unstressed position (as shown in FIG. 2) to a substantially horizontal stressed position wherein the bottom surfaces 120 of each clip member 42 and 44 are supported upon the upper surface of 94 of the base wall 64 between the keyways 108 and 110 and the recess means 88 respectively.

Simultaneous with the forward, sliding advancement of the mounting bracket 16 into the housing section 10, the guiding and locating member 40 is received within the receiving means 86 whereby the lower outwardly extending projections 21 and 23 are aligned and guided into the channels 90. The bottom surfaces 120 of the clip members 42 and 44 are supported in the stressed position upon the upper surface 94 of the base wall 64 between the keyways 108 and 110 and the recess means 88 until the guiding and locating member 40 is seated within the receiving means 86 with a leading edge of the member 40 braced and bearing against the forward wall of the housing section 10 whereupon the clip members 42 and 44 are released by the upper surface 94 and automatically move from the substantially horizontal stressed position to the downwardly extending unstressed position to snap into the recess means 88 provided therefor as shown in FIG. 4. The channels 90 provided upon the inwardly facing sides of the side walls 66 and 68 exert a downward force upon the lower outwardly extending projections 21 and 23 of the upright members 20 and 22 respectively whereby the clip members 42 and 44 are releasably retained within the recess means 88. The restricting means 91 superposedly positioned to the deflection limiting members 46 and 48 preclude vertical lifting of the deflection limiting members 46 and 48 out of position when the downward force is exerted.

Referring to FIGS. 3 and 4, there is shown the shock stabilizing means for precluding movement of the mounting bracket 16 and thereby the processing members 12 and 14 from their position at the predetermined location within the housing section 10 wherein the processing members 12 and 14 are in operative relationship with the film receiving chamber 60, on the film entrance side thereof, and the film exit slot 72 and the camming member 78, on the film exit side thereof when the photographic camera is dropped or otherwise severely shocked. The shock stabilizing means comprises the deflection limiting members 46 and 48 and the shock dampening means 50.

Figure 5:
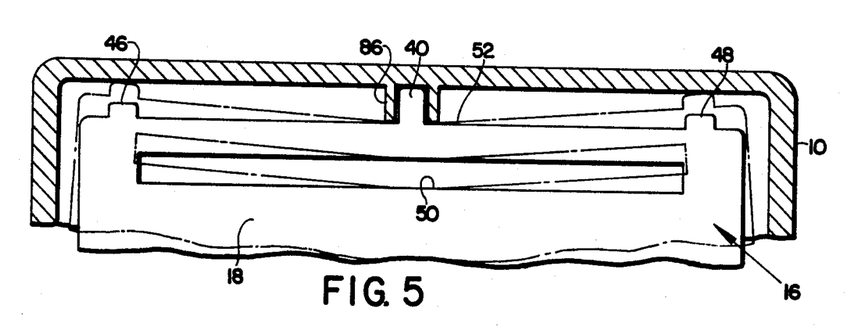
FIG. 5 is an enlarged, top fragmentary view of the mounting bracket and housing section as shown in FIG. 3 with the flexural movement of the housing bracket shown in phantom.

As best shown in FIG. 5, the forwardly extending deflection limiting members 46 and 48 are located substantially outside of the groove 92 when the mounting bracket is snap fitted into the housing section 10 at the predetermined location. As is readily apparent, the mass of the mounting bracket 16 and the components mounted thereon are generally balanced about the guiding and locating member 40 securely seated against the forward wall 70 within the receiving means 86. Should the photographic camera be suddenly and severely shocked as may result from an accidental jarring or dropping thereof, the extraneously imparted impact if substantially severe may change the shape of the mounting bracket 16 and flex the lateral ends thereof about the seated guiding and locating member 40 whereby the deflection limiting members 46 and 48 are moved forward into the groove 92 in the direction of the forward wall 70.

The severity of the shock imparted to the mounting bracket 16 determines the amount of deflection the lateral ends of the bottom member 18 will undergo. However, should the extraneously applied shock produce stress within the bottom member 18 which exceeds the elastic limit of the material, the mounting bracket 16 may be permanently deformed, i.e. take on a permanent set, or fracture, thereby severely disrupting the operative relationship established by the mounting arrangement of the mounting bracket 16 within the housing section 10 at the predetermined location. Therefore, as a precaution thereagainst, the deflection limiting members 46 and 48 are provided to positively restrain the bottom member 18 from being flexed beyond the elastic limit of the material. The deflection limiting members 46 and 48 forward advancement into the groove 92 is restrained by the forward wall 70 of the housing section substantially before the stresses produced by the shock within the bottom member 18 exceed the elastic limit of the material whereby the bottom member 18 will rebound into its original configuration. Therefore, when the bottom member 18 is restored to its original configuration without having exceeded the elastic limit of the material, the restoring internal forces of the material act to retain the bottom member 18 in the original configuration through internal friction.

Should the photographic camera be inadvertently dropped or otherwise suddenly shocked in a manner causing the forward wall 70 of the housing section 10 to receive the full impact thereof, as is generally the case, the effective contact area transmitting the force of the impact to the mounting bracket 16 through the forward wall 70 is provided by the seated guiding and locating member 40. Under such a severe shock or a repeated shock, such as when the photographic camera is dropped and continues to bounce upon a hard surface, the deflection limiting members 46 and 48 may on more than one occasion move forward into the groove 92 and into contact with the forward wall 70 which may result in multiple deflections of the bottom member 18. The limiting action of the deflection limiting members 46 and 48 combined with the restoring forces within the bottom member 18 serve to restore the bottom member 18 to its original configuration as soon as the repeated extraneous impact forces cease to act. Generally, a body will return to its original configuration, but on occasion depending upon its mass, it will pass through and beyond a position of equilibrium and a restoring force will develop in the opposite direction as long as the stresses produced do not exceed the elastic limit of the material. These pendulum type movements through the position of equilibrium and back again will generally continue until the energy imparted by the extraneous impact force is absorbed and dampened out by internal friction whereby the body is returned to a quiescent state.

The shock dampening means or slot 50 serves to prohibit such pendulum type movement and augments the dampening capacity of the bottom member 18 whereby the shock energy received from the extraneous source is substantially precluded from being transmitted to the processing members 12 and 14. While dampening does not affect the natural frequency of a vibrating body, it does substantially effect the amplitude of the vibration by reducing the amplitude whereby the body is rapidly returned to a quiescent state. The shock dampening means 50 forms an abrupt change in the cross section of the bottom 18 by introducing a discontinuity in the structure whereby the mass rearwardly adjacent to the forwardly facing edge 52 having the guiding and locating member 40 and the deflection limiting members 46 and 48 integrally formed thereon is substantially reduced. Therefore, the forwardly facing edge 52 will rebound into its original configuration without being permanently deformed and because of its reduced mass may not pass through and beyond the position of equilibrium. However, if the forwardly facing edge 52 should pass through and beyond the position of equilibrium before restoring forces act to return it to its original configuration the impact energy will not be transmitted across the opening provided by the shock dampening means 50 to the opposing surface of the bottom member 18.

Therefore, as is readily apparent, the deflection limiting members 46 and 48 and the shock dampening means 50 cooperate to provide a shock stabilizing means whereby the processing members 12 and 14 are sustained in a substantially quiescent state at the predetermined location within the housing section 10 in operative relationship when the camera is suddenly and severely shocked or otherwise jarred and subsequent thereto.

Furthermore the flexural movement of the bottom member 18 within the housing section 10 may be employed to facilitate the attachment and detachment of the housing section 10. Flexing the bottom member 18 may enable an assembler to compensate for accumulative manufacturing and assembly stack-up tolerances which may have exceeded the nominal longitudinal dimensions therefor which would not be possible with a rigidly formed bottom member 18 such as that shown in the aforementioned U.S. Pat. 3,974,510. Should the assembler apply substantial force against the arcuate mounting flanges 24 and 26 of the upright members 20 and 22 respectively, the bottom member 18 may be deflected about the seated guiding and locating member 40 until the forwardmost edge of the stress limiting members 46 and 48 are in bearing contact against the forward wall 70 whereby the rearwardly and downwardly extending clip members 42 and 44 may be brought slightly forward of the rear forwardly sloped inclined wall 104 and thereby facilitate the snap fit insertion or removal of the clip members 42 and 44 from within the recess means. When the assembler releases the pressure, the bottom member 18 in response thereto will return to its original relaxed configuration.

As previously mentioned, the forwardly extending guiding and locating member 40 is substantially greater in length than the parallel, forwardly extending deflection limiting members 46 and 48 whereby the member 40 is fully seated within the receiving means 86 and is bearing against the forward wall 70 when the mounting bracket 16 is releasably retained at the predetermined location within the housing section 10. The recess means 88 are configured to preclude rearward movement of the clip members 42 and 44 against the forwardly sloping inclined wall 104 when snap fitted therein. Therefore, the mounting bracket 16 is longitudinally located and releasably retained in the predetermined location within the housing section 10 subsequent to their being snap fitted together.

The channels 90 exert a downward force upon the lower outwardly extending projections 21 and 23 when the mounting bracket 16 is snap fitted into position at the predetermined location whereby the clip members 42 and 44 are releasably secured within the recess means 88. The downward force further precludes vertical movement of the rearwardly facing edge 54 of the mounting bracket 16 within the housing section 10.

The receiving means 86 is configured to snugly accommodate the guiding and locating member 40 therein beneath the edge 96 formed by the blind groove 92 within the inner surface 93 of the forward wall 70. The restricting means 91 serves to limit the vertical lifting of the deflection limiting members 46 and 48 while the receiving means 86 is configured to substantially preclude the guiding and locating member 40 from being jarred out of position therein.

The mounting bracket 16 is precluded from lateral movement and thereby misalignment with the film cassette receiving chamber 60 by the attachment thereof to the mounting frame 58. The upper outwardly extending projection 56 is provided to bear against the inner surface of the side wall 66 and to cooperate with the lower outwardly extending projections 21 and 23 in precluding lateral movement of the housing section 10 upon the mounting bracket 16.

The base wall 64 of the housing section 10 preferably include thereon a plurality of inclined bearing surfaces 124 extending rearwardly and upwardly from the inner surfaces of the forward wall 70 in the direction of an open end of the housing section 10 for underlying and bearing against an underside of the bottom member 18 of the mounting bracket 16. The bearing surfaces 124 provide a means for establishing a generally transverse planar surface for stabilizing and thereby assuring that the bottom member 18 is supported upon a level surface so that the bite between the processing members 12 and 14 shall remain transversely operative with the film cassette receiving chamber 60 on the entrance side thereof and the film exit slot 72 and camming member 78 on the exit side thereof in a plane substantially perpendicular to the forward 70 of the housing section 10.

The housing section 10 may be detached from the mounting bracket 16 with relative ease for repair, cleaning or replacement of parts, by exerting an opposing force against the means for exerting a downward force 90 and elevating the rearwardly facing edge 54 of the mounting bracket 16. The clip members 42 and 44 are released from within the recess means 88 in response thereto aided by the inclined surface of the forwardly sloping wall 106 which acts to cam the clip members 42 and 44 out of the recess means 88. Once the bottom surface 120 of supported clip members 42 and 44 are raised and suported upon the upper surface 94 of the base wall 18 between the keyways 108 and 110 and the recess means 88, the housing section 10 may be advanced forwardly away from the mounting bracket 16 and/or the mounting bracket 16 withdrawn rearwardly to detach mounting bracket 16 and the housing section 10 without the assistance of a fixing tool.

From the foregoing, it can be seen that there has been disclosed a new and improved shock stabilizing mounting apparatus for a pair of juxtaposed processing members incorporated within a photographic camera for distributing a fluid processing composition between predetermined layers of a self-developing type film unit whereby a development and diffusion transfer process is initiated. The processing members are releasably retained at a crtical predetermined location with the photographic camera to optimize the processing of the film unit and to uniformly distribute the processing composition over an entire photoexposed area of the film unit. The mounting apparatus locates the processing members at the predetermined location within the photographic camera and sustains the processing members at the predetermined location even when the photographic camera is suddenly and severely shocked through extraneous vibrations or jarring as may result from inadvertently swinging or dropping the camera against a hard surface.

The invention may be practiced or embodied in still other ways without departing from the spirit and essential character thereof. The preferred embodiment described herein is therefore to be considered illustrative and not restrictive, the scope of the invention being indicated by the appended claims and all variations which come within the meaning of the claims are intended to be embraced therein.

What is claimed is:

1. Photographic apparatus for use with a camera of the self-developing type comprising:
    a housing section for receiving and locating a mounting bracket therein at a predetermined location, said housing section including a wall having means for defining an elongated opening through which a film unit may be advanced and means for guiding the mounting bracket to said predetermined location;
    a pair of elongated pressure-applying members adapted to be mounted in juxtaposed relation for spreading a processing fluid across a layer of an exposed film unit; and
    a mounting bracket for coupling said pressure-applying members to said housing section with said pressure-applying members mounted in juxtaposed relation and in operative relation with said elongated opening in said wall, said mounting bracket including a base section having opposing ends and means, located substantially intermediate said opposing ends, projecting therefrom and receivable by said guiding means in said wall for locating said mounting bracket at said predetermined location and means for dampening a shock imparted to said mounting bracket via said wall and said projecting means whereby said opposing ends of said base section may flex about said projecting means and toward said wall.

2. The photographic apparatus as defined in claim 1 wherein said base section further includes means for limiting deflection of said base section of said mounting bracket towards said wall, said limiting means being adapted to engage said wall when said base section is deflected towards said wall about said projecting means by an extraneous force imparted thereto.

3. The photographic apparatus as defined in claim 2 wherein said projecting means and said limiting means comprise a plurality of rigid projecting surfaces extending substantially parallel with each other from said base section.

4. The photographic apparatus as defined in claim 3 wherein said rigid projecting surface of said projecting means is substantially greater in length than said projecting surfaces of said limiting means whereby said projecting means may be seated within said guiding means with said limiting means spaced a predetermined distance from said wall for flexural movement of said mounting bracket when the extraneous force is imparted to said wall.

5. The photographic apparatus as defined in claim 1 wherein said shock dampening means includes means defining a slot extending laterally within said base section between said opposing ends.

6. The photographic apparatus as defined in claim 2 wherein said mounting bracket and said housing section respectively include complementary coupling means thereon for automatically and releasably coupling said mounting bracket to said housing section when said projecting means is seated within said receiving means.

7. Photograhic apparatus comprising:
    an exterior housing member having an elongated film exit formed therein;
    a pair of elongated pressure-applying members; and
    means for mounting said elongated pressure-applying members in juxtaposition, said mounting means including a base section having an elongated leading edge extending in a direction substantially parallel to said elongated pressure-applying members and an elongated slot closely spaced from its said elongated edge and substantially oriented in the same direction with respect thereto, said mounting means and said exterior housing memberhaving cooperating means associated therewith for attaching said mounting means to said exterior housing member with said elongated pressure-applying members disposed in substantially parallel and operative relationship to said film exit, said attaching means including a projection extending between said exterior housing member and said leading edge of said base section at a position intermediate the ends of said elongated slot, whereby an impact experienced by said exterior housing member will be transferred through said projection to said base section with the portion of said base section intermediate its said leading edge and its said elongated slot flexing in a shock absorbing manner.

* * * * *